April 21, 1931.   J. D. KOPSHO   1,802,260
FISHING LINE SINKER
Filed Sept. 10, 1929

Inventor
Joseph D. Kopsho

By Clarence A. O'Brien
Attorney

Patented Apr. 21, 1931

1,802,260

UNITED STATES PATENT OFFICE

JOSEPH D. KOPSHO, OF FULLERTON, CALIFORNIA

FISHING-LINE SINKER

Application filed September 10, 1929. Serial No. 391,521.

This invention relates to sinkers and more particularly to sinkers which are adapted for connection with a fishing line and has for one of its objects to provide, in a manner as hereinafter set forth, a sinker of the aforementioned character having means embodied therein for slidably mounting same on the line.

When fishing with a line having a hook, or a plurality of chains connected thereto, the conventional sinker is usually tied to the line at or adjacent to its lower end for the purpose of weighting said lines and the hooks carried thereby down.

In cases where the sinker is interposed and securely tied to the line at a point intermediate the hooks and the upper end of the line, which is held by the fisherman, it frequently occurs that a fish will bite or nibble on the bait and the fisherman will be unaware of the fact, due to the fact that the sinker withstands the pull of the fish on the hook and prevents said pull from being transmitted through the line to the surface. This not only results in a great number of fish escaping, which would otherwise be caught, but in addition frequently permits the fish to remove all of the bait from the hook, without the knowledge of the fisherman and he eventually discovers that he has been attempting to catch fish with an unbaited hook for an unknown length of time, a very annoying discovery.

One of the objects of this invention is to provide, in a manner as hereinafter set forth, a sinker of the aforementioned character which is adapted to be slidably mounted on the hook, in a manner which will permit the fishing line to slide freely therethrough when pulled or tugged on, by a fish, attempting to get the bait on the hook, with the result that the fisherman will be warned of the fact.

Another object of the invention is to provide, in a manner as hereinafter set forth, a sinker of the aforementioned character having laterally extending integral means thereon for anchoring the same on the bottom of the body of water in which the device is used.

Other objects of the invention are to provide a sinker of the aforementioned character, which will be simple in construction, strong, durable, efficient in its use, and which may be manufactured at low cost.

Other objects and advantages of the invention will become apparent from a study of the following specification, taken in connection with the accompanying drawings, wherein like characters of reference designate corresponding parts throughout the several views, and wherein.

Figure 1:
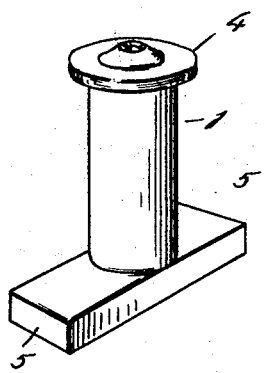
Figure 1 is a perspective view of a sinker constructed in accordance with this invention.
Figure 2:
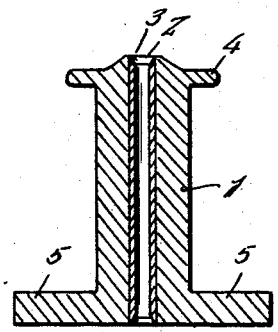
Figure 2 is a vertical sectional view thereof.
Figure 3:
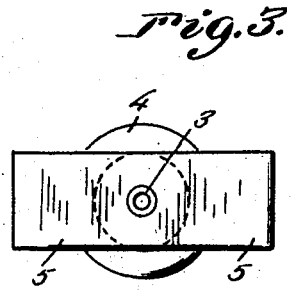
Figure 3 is a bottom plan view of the sinker.

Referring to the drawings in detail, the reference character 1 designates a cylindrical body which may be formed of any suitable material, such as lead, iron or copper, said body portion being of tubular form and provided with a longitudinal bore 2 and is provided with a lining sleeve 3 of comparatively soft metal, which extends longitudinally through the bore 2. At its upper end the body portion 1 of the sinker is provided with a peripheral flange or bead 4, and at its opposite end, the body 1 is provided with horizontal oppositely extending arms 5. As disclosed in the drawings, the flange 4 and the arms 5 are formed integrally with the body portion 1 of the sinker.

In the use of the invention, the fishing line is threaded through the bore in the lining sleeve 3 and a suitable cross pin or key is tied into said line below the sinker, said cross pin being of a size greater than the bore through the lining 3 for preventing same from being drawn therethrough. A leader of suitable length is then secured to the lower end of the line, and a hook attached to the free end of the leader.

When thus connected, any pull which may be exerted on the line, through the medium of a fish biting on the baited hook will be transmitted through said line to the end which is held by the fisherman and said line is free to move in one direction, through the sinker. When not in use, or when withdrawing the line from the water, the sinker 1 is supported on the cross pin or key which is tied in the line and is then prevented from sliding downwardly thereon to the lower end. When resting on the bottom of the river or body of water, where the device is being used, the flange 4 and the laterally projecting arms 5, engage in said bottom and prevent the sinker from being shifted, thus causing the line to slide therethrough when a fish pulls thereon. The softness of the lining 3 reduces wear on the fishing line which results from said line sliding through the lining.

It is believed that the many advantages of a sinker constructed in accordance with this invention will be readily understood and although the preferred embodiment of the invention is as illustrated and described, it is to be understood that changes in the details of construction may be had, which will fall within the scope of the invention as claimed.

What is claimed is:

A sinker of the character described, comprising an elongated cylindrical body portion of metal having a longitudinal bore of uniform diameter throughout extending therethrough, a tubular lining extending longitudinally from end to end through the bore in the body portion and formed of a material of less hardness than the body portion, the body being for the passage of a fishing line therethrough for mounting the sinker thereon for free sliding movement, an annular flange formed on the upper end of the sinker, and oppositely extending right angularly disposed lateral arms mounted on opposite sides of the sinker at its lower end.

In testimony whereof I affix my signature.

JOSEPH D. KOPSHO.